| United States Patent [19] | [11] 3,910,130 |
| --- | --- |
| Traughber, Jr. | [45] Oct. 7, 1975 |

[54] SELF-TENSIONING CABLE DRIVE
[76] Inventor: Charles W. Traughber, Jr., Box 88C, Candler, N.C. 28715
[22] Filed: Oct. 29, 1974
[21] Appl. No.: 518,572

[52] U.S. Cl. .................. 74/242.9; 74/224; 74/225
[51] Int. Cl.² ..................... F16H 7/08; F16H 7/00
[58] Field of Search .................. 74/242.9, 224, 225

[56] References Cited
UNITED STATES PATENTS

| 2,244,033 | 6/1941 | Trempe ..................... 74/242.9 X |
| 2,801,731 | 8/1957 | York ........................ 74/242.9 X |
| 3,608,389 | 9/1971 | Christian ..................... 74/242.9 |
| 3,854,537 | 12/1974 | Nelmark et al. ............... 74/242.9 X |

Primary Examiner—Leonard H. Gerin
Attorney, Agent, or Firm—Woodard, Weikart, Emhardt & Naughton

[57] ABSTRACT

Disclosed is a self-tensioning endless rope or cable drive system in which a sectional load engaging dolly is used, the dolly sections being joined by a block and tackle reeving of the endless rope so that as the load is picked up, or engaged, by the dolly, a predetermined portion of the force necessary to move the load is transferred to the lower tension portion of the endless rope to thereby prevent slipping of the cable at the area of application of motive driving power thereto.

10 Claims, 5 Drawing Figures

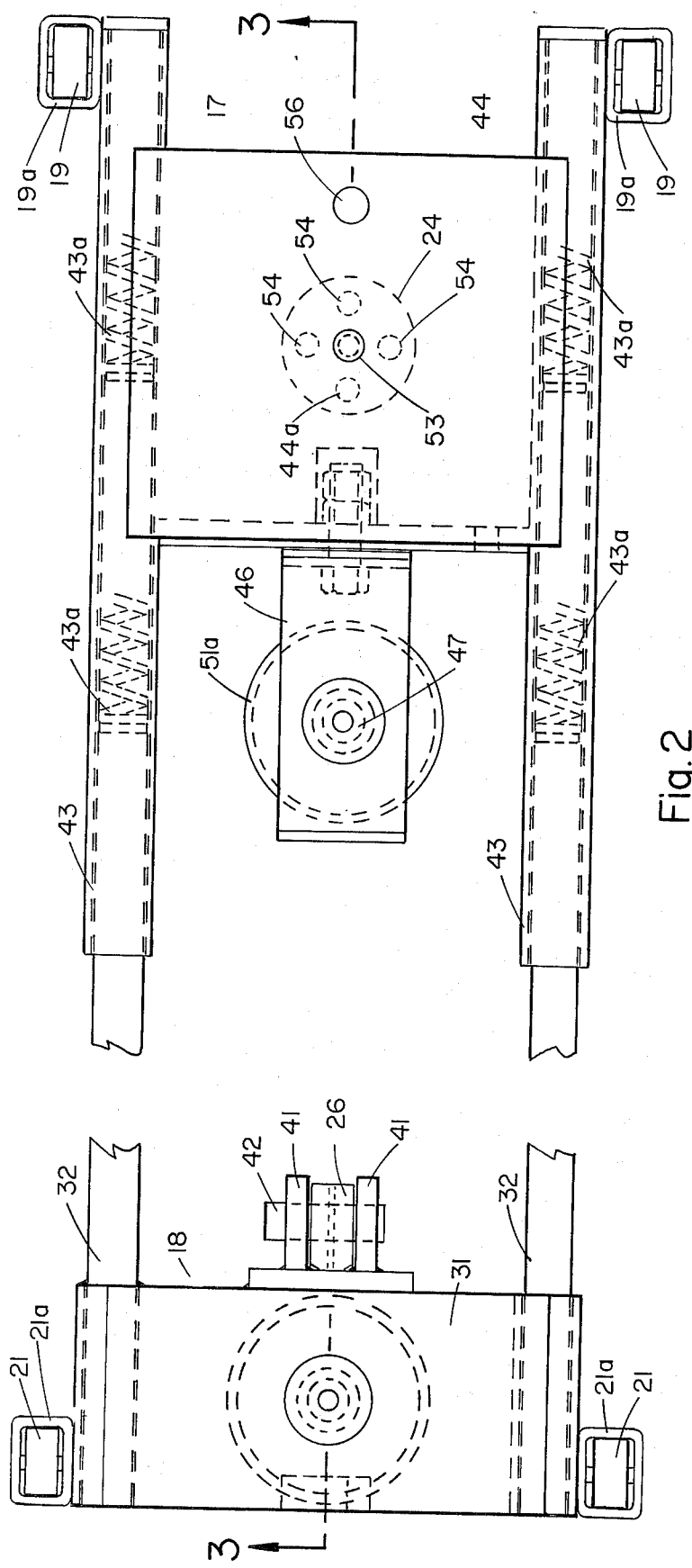
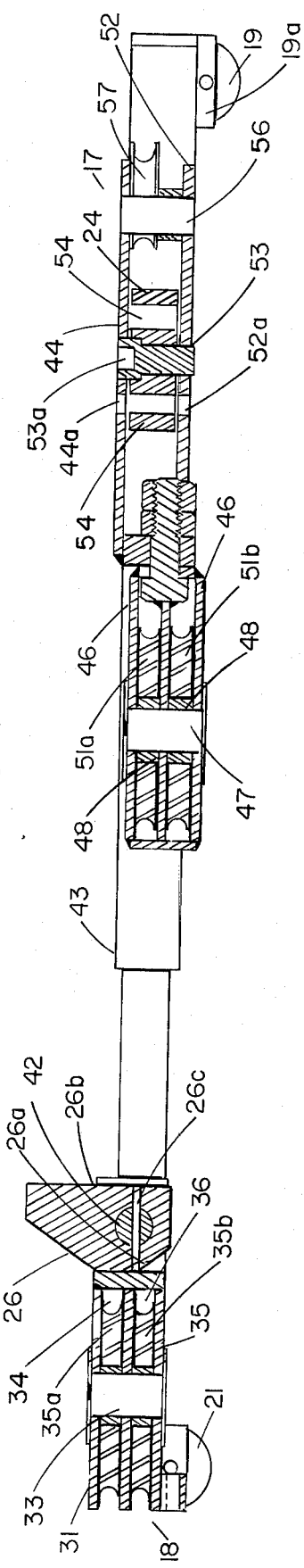
Fig. 2
Fig. 3

SELF-TENSIONING CABLE DRIVE

BACKGROUND rope THE INVENTION

Endless wire ropes drives are utilized in many and various applications, one example is its use in the brick making industry where it is used to move wheeled containers or carts of heavy ceramic objects such as bricks from one oven or area of the plant to another.

The transmission of power by endless rope drives, such as elliptical and U-groove drives, depends upon the frictional resistance developed between the cable and the drum surface. A driving force is transmitted from the surface of the driving pulley to the cable because of the frictional resistance between the two surfaces. This frictional resistance(and, hence, the load moving power available) is, of course, a direct function of the tension in the cable and its length of contact with the drum. The effective length of contact with the driving drum can be increased by using a drive drum or pulley means which includes a plurality of driven drums with the cable wrapped, in multiple, around the assembly such multiple drum drives and single drum drives all being generically included in the term "drive pulley means" as used herein.

The tension in the cable, and hence the normal force exerted by it on the drive drum, will vary throughout its length of contact with the drum and this force will increase in magnitude from the smaller, or low, tension side of junction of the cable and drum ($T_s$) to the large, or high tension side of the belt ($T_L$). When the cable picks up or engages a load it is thus quite important to maintain the proper tension on the low tension side of the cable and various weight-type and power cylinder devices, whose action is independent of the magnitude of the load, are utilized in prior art systems for tensioning the cable or belt, that is, for maintaining the desired tension on the low tension side of the belt. The driving force available is dependent upon maintaining the proper ratio of the larger tension side of the cable ($T_L$) to the smaller tension side ($T_s$). As a load is picked up by the cable, since $T_L$ thereupon increases substantially as a direct function of the magnitude of the load, in order to maintain the proper $T_L$ to $T_s$ ratio the tension on the smaller tension side of the cable ($T_s$) must be increased.

The system and apparatus of the present accomplishes the proper tensioning of the cable by utilizing a sectional load pick-up dolly with the dolly section carrying the load engaging abutment being secured to the cable-attached, remaining dolly section by means of a block and tackle type reeving of the cable extending between the dolly sections. When a load is engaged, therefore, a predetermined fraction of the force necessary to move the load is transferred to the smaller tension side of the cable, the magnitude of the fraction being inversely proportional to the number of passes of the cable making up the block and tackle type connection between the dolly sections. The tensioning force transferred to the lower tension side of the cable is, thus, a direct function of the size of the load to be moved. no external source of hydraulic or pneumatic power is required for cable tensioning. At no-load operation resilient means are provided for insuring a minimum tension on the cable to prevent slippage. The tensile stress on the cable system is thus reduced except when a load is engaged. A take-up winch may be provided on one of the dolly sections to compensate for any permanent stretching deformation of the cable. A modified form of the dolly, utilizing three, rather than two dolly sections, permits bi-directional operation of the system.

BRIEF DESCRIPTION OF THE DRAWINGS

FIG. 2 is a top plan view of the two-section dolly embodying the present invention.

FIG. 3 is a side sectional view taken generally along the line 3—3 of FIG. 2.

DESCRIPTION OF THE PREFERRED EMBODIMENTS

Figure 1:
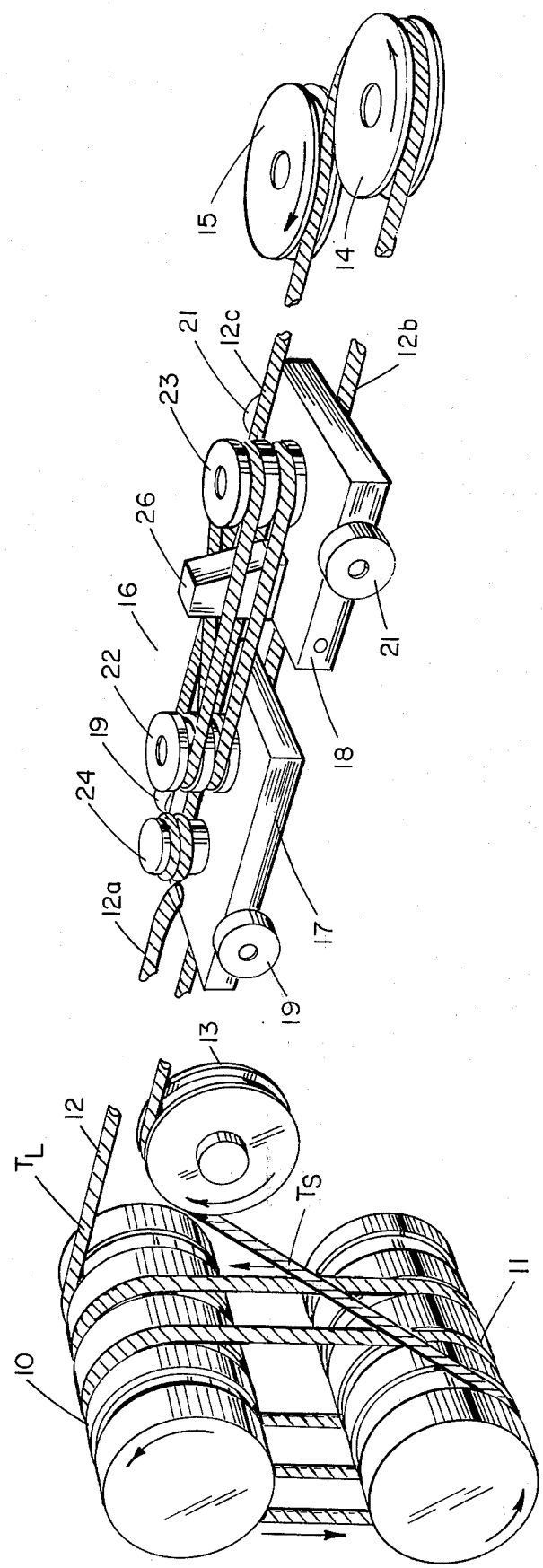
FIG. 1 is a schematic, perspective view of an endless rope drive system incorporating the present invention.

Referring initially to FIG. 1, there is shown a multiple drum drive which includes adjacent driving hubs or drums 10 and 11, both of these drums being driven at the same speed by a reversible motor (not shown) and through a gear reduction system as is customary. The driving drums are rotated in the same direction and are provided with multiple, matching grooves which accommodate passes of an endless belt 12. With the drums rotating in the direction indicated in FIG. 1, the belt will have a larger tension side $T_L$ and a smaller tension side $T_s$. The use of the dual driving drums increases the total arc of contact of the belt with the driving drums thereby increasing the available power for moving loads picked up by the belt. As is customary the smaller tension side of the belt moves over an idler sheave 13 and over tail sheaves 14 and 15, these serving to reverse the direction of the belt and direct it toward its larger tension junction ($T_L$) with the drum 10. A load engaging member or dolly is carried by the rope and indicated generally at 16. The dolly is interposed within a separation in the rope 12 and is formed by two dolly sections 17 and 18. The dolly section 17 is secured to the larger tension side of the rope indicated at 12a and, assuming that the drive pulley assembly 10 and 11, is rotating in the direction indicated in FIG. 1, the dolly section 17 will be the leading section. The dolly section 18 is provided with wheels 21, the wheels 19 and 21 accommodating the dolly for travel along the path of the belt 12 which is the path over which a load is to move leftwardly as viewed in FIG. 1 from, in general, the location of the tail sheaves 14 and 15 to the pulley assembly 10 and 11.

The lower tension portion of the belt, indicated at 12b, moves unbroken beneath or adjacent to the dolly 18. The other portion of the lower tension side of the rope, indicated at 12c extends over the dolly section to the dual sheaves indicated generally at 22. The sheaves 22 are freely rotatable independently and are carried by the leading dolly section 17. The rope extends between the sheaves 22 and dual, independent sheaves 23, carried by the dolly section 18, in multiple passes, as will subsequently be described in detail with reference to FIG. 5. After its final excursion around the lower one of the sheaves 23 the rope extends to the leading dolly 17 and is attached to the dolly section 17 by means of a take-up winch 24 carried by the leading dolly section. It will be understood that the take-up winch might be located on dolly section 18, rather than leading section 17, however, in this case there would be one less pass of the rope from the sheaves 23 to the leading dolly section 17. The trailing dolly section further carries a load engaging abutment 26 which is pivotally supported so that it is capable of engaging a load in only one direction of movement of the dolly, that is, as the dolly moves from right to left in FIG. 1.

Figure 4:
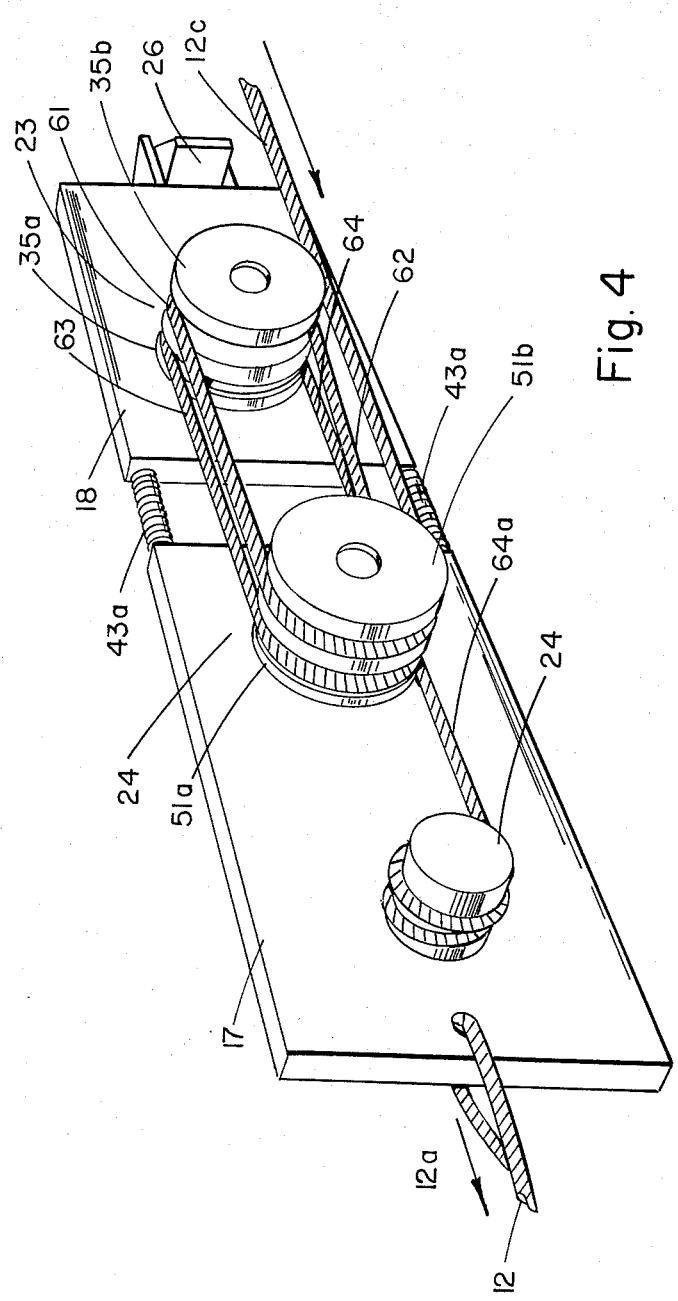
FIG. 4 is a schematic, top view of the dolly structure shown in FIGS. 2 and 3 but illustrating, in detail, the reeving between the dolly sections.

Further details of the dolly construction and its function in providing a tensioning force to the smaller tension side of the rope ($T_s$) will become evident upon an examination of FIGS. 2–4 now to be described.

Referring to FIGS. 2 and 4, the dolly 16 includes a trailing section 18 (mentioned previously with respect to FIG. 1) which includes a plate 31 carrying telescoping members 32 which extend longitudinally toward the adjacent dolly section 17. The wheels 21 are journalled in supporting housings 21a which may be welded or otherwise suitably fastened to the adjacent plate structure. Depending from the plate 31 are dual, grooved sheaves 35a and 35b which are free to rotate on the stub shaft 33, the sheaves carrying peripheral rope or cable grooves 34 and 36, respectively. These sheaves are the counterparts of the sheaves 23 illustrated schematically in FIG. 1.

Extending from plate 31 are spaced members 41 (FIG. 2) which journal a shaft 42 carrying the load-engaging abutment or dog 26 previously referred to with reference to FIG. 1. The abutment element 26 is contoured at 26a so that it is capable of clockwise rotation about the axis of shaft 42 when engaging a load (such as a pick-up lug, not shown, on the underside of a load conveyor car) when the dolly is moving from right to left as viewed in FIG. 3, thereby slipping past the pick-up lug. Engagement of the surface 26b with a pick-up lug, as the dolly moves in the opposite direction, however, because dog 26 remains upright and cannot rotate, will cause the dolly to pick up the load. A spring pin 26c, and an additional spring (not shown), urges the dog into its upright position.

The extending members 32 telescope within tubes 43 rigidly supported on the plate 44 which forms a portion of the body of the leading dolly section 17. COmpression springs 43a resist movement of dolly section 18 toward dolly section 17. Spaced plates 46 extend from plate 44 and a stationary shaft or post 47 extends vertically between the plate. Freely and independently rotatable on bearings 48 encircling the post 47 are the sheaves 51a and 51b. These sheaves are aligned with sheaves 35a and 35b respectively and form the multiple sheave assembly generally indicated at 22 in FIG. 1.

Spaced beneath the plate 44 is a plate 52 and interposed between the plates is a shaft 53 which is manually rotatable by any suitable means such as insertion of a tool into its head 53a. The shaft carries the take-up winch 24, previously mentioned with reference to schematic FIG. 1. The winch is locked by insertion of a pin (not shown) in whichever of the four apertures 54 in the winch register with the openings 44a and 52a in the plates 44 and 52 when the proper adjustment of the winch has been made. As previously mentioned, winch 24 might be located on dolly section 18. A post 56 carries a rope thimble 57 around which the cable or rope may be secured. Wheel housings 19a carry the wheels 19 and are welded or otherwise rigidly secured to the tubes.

FIG. 4 illustrates the sectional dolly schematically and is utilized to illustrate in detail the reeving of the rope or cable upon the sheaves and the take-up winch. In FIG. 4 the dolly is shown in simplified form with parts omitted and with the rotational axes of the sheaves and winch transposed to generally horizontal, rather than vertical, position so the reeving and the block-and-tackle mode of operation of the dolly will be evident. For clarity the same reference numerals are used for corresponding parts in FIGS. 1, 2, 3, and 4, although the parts may appear somewhat different in position or contour in the schematic showing of FIGS. 1 and 4 compared to their appearance in FIGS. 2 and 3.

As previously mentioned and as shown in FIG. 4, the rope or cable is separated and the sectional dolly is interposed in the separation with the high tension side of the rope 12, the portion nearest the driving pulley 10, being attached to dolly section 17 at 12a (the attachment is made around thimble 57 on the actual dolly structure shown in FIG. 3). The low tension portion 12c of the rope, the portion nearest idler or tail sheave 15, extends past the trailing section 18 of the dolly and around the grooved surface of sheave 51b. The rope extends from sheave 51b to sheave 35b in a pass identified at 61 in FIG. 4. Leaving the underside (as viewed in FIG. 4) of sheave 35b, the rope extends back to dolly section 17 in a pass identified at 62. The rope then enters the groove of sheave 51a at its underside (as viewed in FIG. 4) and extends around sheave 51a to exit at the top of sheave 51a and extend, in a pass identified at 63, to sheave 35a on trailing dolly section 18. The rope extends around the grooved peripheral surface of sheave 35a and extends from the lower side of the sheave to the leading dolly section 17 and past sheave 51a is a pass identified at 64 to terminate by being attached to the take-up winch 24, as indicated at 64a.

As will be evident from FIG. 4, the dolly sections and the reeving of the rope between them is analogous to a block and tackle connection between the dolly sections. The member 26 picks up the load and the dolly section 18 is analogous to the movable block with multiple sheaves in a conventional block and tackle hoist; the dolly section 17 can, for purposes of analysis be considered to be the fixed block of a conventional block and tackle hoist. As is well known in the mechanics of block and tackle hoists a load picked up by member 26 can be moved from right to left, as viewed in FIG. 4, by exerting a pulling force on the pull rope (for purposes of analysis considered to be rope portion 12c) of $1/n$ times the load, where $n$ is the number of rope passes extending from the movable block (dolly section 18), and neglecting friction in the sheaves. Thus, continuing the analogy, if member 26 is to move a load W, a pull must be exerted on rope 12c of ¼ ($n=4$ in FIG. 4) of the load W.

Now deserting the analogy to the extent that dolly section 17 no longer be considered stationary but mobile and fastened to the higher tension side of the rope 12 (as, in fact, it is in FIGS. 4 and 1) when member 26 engages a load W, the drive pulley assembly 10–11 (FIG. 1) will apply to the system a force necessary to move the load if proper belt tension at $T_s$ (FIG. 1) is maintained. As dolly section 17 starts to move leftwardly, as viewed in FIG. 1 and 4, the distance between dolly sections 17 and 18 will increase slightly but eventually dolly section 18 and consequently the load, engaged by member 26, will begin to move. As this occurs, since this is a balanced, stable system, a tensioning force will be transferred to the smaller tension side of the rope (12c) which is equal (approximately, neglecting friction) to ¼ of the load ($n=4$). The block and tackle action of the dolly automatically, upon the imposition of a load on the system, transfers to the smaller tension side of the rope, and thus to the pulley rope junction $T_s$ (FIG. 1), a predetermined fraction of the force necessary to move the load. As load movement proceeds the dolly section 18 is separated from dolly section 17 by a distance which depends upon the magnitude of the load.

In operation, the take-up winch 24 (FIG. 1) is initially adjusted to take up any excess cable and to draw the dolly section 18 toward dolly section 17 somewhat so that compression springs 43a (FIG. 2) are compressed somewhat. This establishes a minimum initial tension on the rope so that the system will produce sufficient frictional force between the rope and the driving pulley assembly 10–11 to enable it to move the cable and dolly under no-load conditions, that is, when the member 26 is not engaged with a load to be moved. It will be understood that, as previously mentioned, as the cable moves the dolly from right to left, that is, with the drive pulley assembly rotating counterclockwise as viewed in FIG. 1, the load pick-up member 26 will engage a suitable abutment on a loaded car (not shown) or container as it passes beneath the car. When the drive is reversed, the member 26 will not engage a loaded container but will pivot and slip past the container or car. The system illustrated in FIG. 1 thus is adapted to move loads unidirectionally only.

When a load is engaged by member 26, as pointed out previously with reference to FIG. 4, the dolly section 18 will separate somewhat further from dolly section 17 and a fraction (approximately, neglecting friction, ¼ since $n=4$) of the force necessary to move the load exerted by the drive pulley assembly is transferred to the smaller tension side 12b of the rope, thereby increasing the tension at $T_s$ (FIG. 1) as required. The action of the dolly is such as to increase $T_s$ as the load increases, thus automatically conditioning the system for accommodating loads of various magnitudes.

Figure 5:
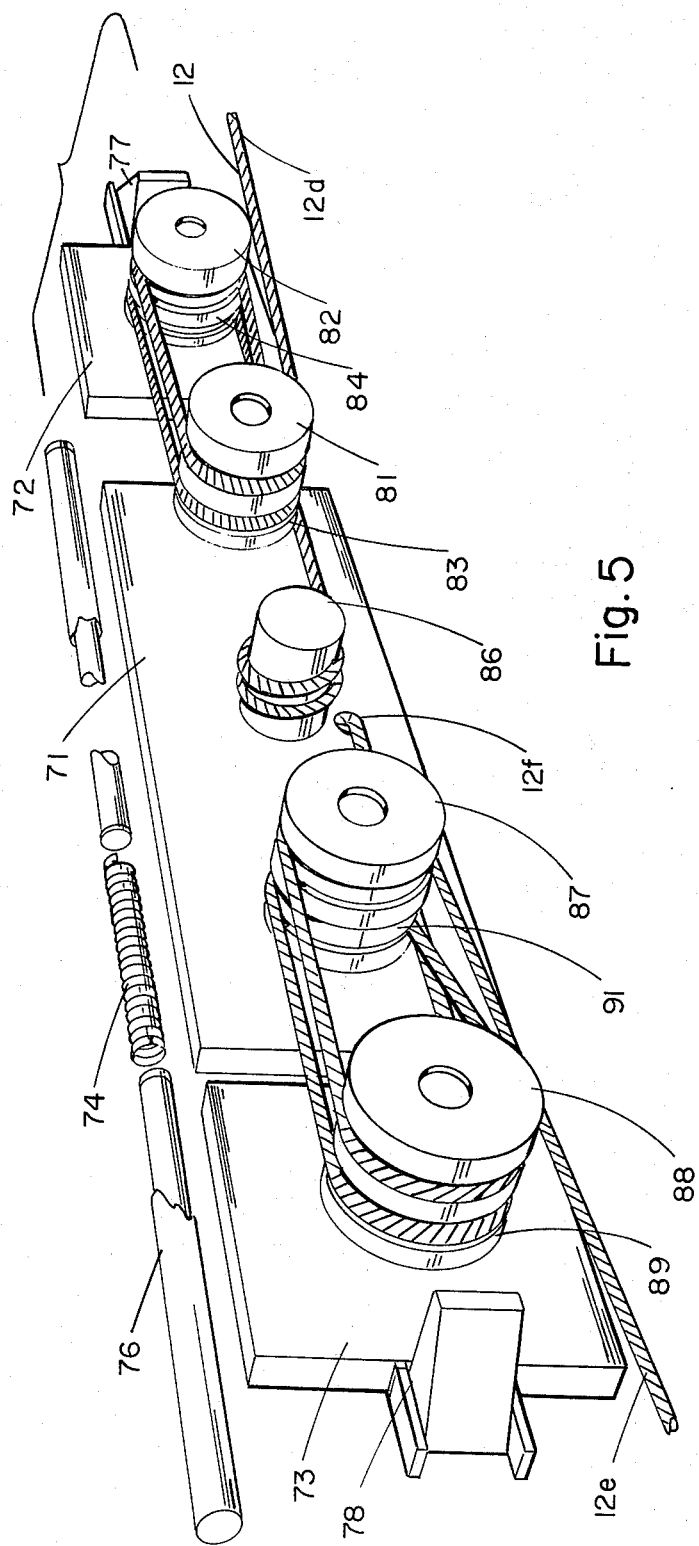
FIG. 5 is a schematic top view, similar to FIG. 4, but illustrating a modified form of the dolly which utilizes three, rather than two, dolly sections.

A modified form of the dolly, utilizing three sections, is schematically illustrated in FIG. 5 and is adapted for bidirectional movement of a load, that is, movement of a load in either direction of movement of the rope. The structure includes a central dolly section 71 which floats between the dolly sections 72 and 73. The outer dolly section 72 and 73 are urged apart by a compression spring schematically shown at 74 which acts on a telescoping rod and tube assembly 76 carried jointly by the two outer dolly sections.

The two outer dolly sections 72 and 73 each carry a load engaging abutment 77 and 78, respectively. It will be understood that the abutments correspond in structure to the abutment 26 of FIG. 1 and that abutment 77 is contoured and pivotally mounted so that it will pick up loads only when the dolly is moving from right to left as viewed in FIG. 5, and abutment 78 will pick up loads only when the dolly is moving from left to right.

The rope or flexible cable 12 extends, as indicated at 12d, from the tail sheaves (not shown in FIG. 5), freely across dolly section 72 and around a freely rotatable sheave 81 carried by central dolly section 71 and back to freely rotatable sheave 82 carried by dolly section 72. The rope then passes around and between freely rotatable sheaves 83 and 84, carried by dolly sections 71 and 72, respectively, in block and tackle fashion. The rope is accommodated on the take-up winch 86, which corresponds to take-up winch 22 of FIG. 1.

As indicated at 12e in FIG. 5 the rope 12 passes freely across the dolly section 73 and around a freely rotatable sheave 87 carried by dolly section 71. The rope then passes in block and tackle fashion between sheaves 88 and 89 which are carried by dolly section 73, and the sheave 91, mounted on the same rotational axis as sheave 87. Finally, the rope is rigidly anchored to the central dolly section 71, as indicated at 12f. It will be noted that the number of rope passes extending from sheaves 82–84 and from sheaves 87–91 are both four so that, in each case, $n$ equals four.

The operation of this three-section dolly is generally the same as that described with reference to FIGS. 1–4. The central dolly section 71 changes its relative position with respect to the outer dolly sections depending upon which of the two outer dolly sections has picked up the load. When the abutment 77 picks up the load, moving it from right to left in FIG. 5, the central dolly section 71 will be pulled forward against dolly section 73, as illustrated in FIG. 5, and a predetermined fractional portion, approximating (neglecting sheave friction) $1/n$, of the force necessary to move the load will be transferred to the smaller tension side (12d) of the rope. Similarly, when the abutment 78 picks up the load, the dolly section 71 will be drawn against the dolly section 72. The side of the rope 12e, now the smaller tension member, will have transferred to it approximately a $1/n$ fraction of the force necessary to move the load.

In the foregoing description and in the claims in this application it will be understood that "approximately equals" refers to neglect of sheave friction in arriving at the values involved. While the load pick-up abutments are disclosed as directional-sensitive pivoted dogs, it will be evident that these could take the form of manually actuated members or remotely operated members, with, for example, electrical solenoid actuators. "Rope" as used herein is intended to include any flexible member such as a chain, cable, belt, or the like.

I claim:

1. A self-tensioning, endless rope drive system comprising rotating drive pulley means accommodating a rope on a portion of its peripheral surface, the rope extending tangentially from the pulley means, then around a sheave spaced from the pulley means and returning tangentially to the pulley means so that as the drive pulley means rotates, one portion of the rope moves onto said drive pulley means under high tension and another portion moves off said drive pulley means under lower tension, a load-engaging member carried by said rope and adapted to be moved between said sheave and said pulley means, and force transferring means extending between said load-engaging member and said rope for applying a predetermined portion of the driving force necessary to move the load engaged by said member to said lower tension portion of the rope.

2. A self-tensioning endless rope drive system comprising a rotating drive pulley assembly and an idler sheave spaced therefrom along a path over which a load is to be moved, a rope extending from said pulley assembly around said idler sheave and returning to said pulley assembly, whereby as said drive pulley assembly rotates said rope moves onto the pulley assembly under high tension and off said pulley assembly under lower tension, a sectionalized dolly having at least two generally aligned segments spaced along and adapted to travel along said path over which a load is to be moved, said dolly being interposed within a separation in the rope intermediate said path, the leading dolly section and the trailing dolly section carrying matching sheave assemblies, the portion of the rope adjacent said rope separation and nearest said idler sheave extending to the sheave assembly on the leading dolly section and thence in $n$ passes between the leading dolly section sheave assembly and the trailing dolly section sheave assembly, $n$ being a whole integer, and a load engaging element carried by said trailing dolly section whereby as said rope is moved by said drive pulley assembly and a load is engaged by said element an approximate $1/n$ fraction of the force necessary to move the load is transferred to said lower tension side of the rope by the block and tackle action of the leading and trailing dolly section sheave assemblies.

3. A self-tensioning endless rope drive system as claimed in claim 2 in which said load engaging element is adapted to engage a load when said element is moved in one direction by said dolly but not when moved in the opposite direction.

4. A self-tensioning endless rope drive system as claimed in claim 2 in which each of said dolly section sheave assemblies is formed by dual sheaves rotating on the same axis and $n$ equals four.

5. A self-tensioning endless rope drive system as claimed in claim 2 in which resilient means urges said dolly sections apart to place a minimum tensioning force on the lower tension side of the rope.

6. A self-tensioning endless rope drive system as claimed in claim 5 in which said resilient means takes the form of telescoping members jointly carried by said dolly sections with compression springs resisting telescoping of the members.

7. A self-tensioning endless rope drive system as claimed in claim 2 having adjusting means on said dolly for adjustably reducing the effective length of said rope to compensate for permanent strength thereof after prolonged use and for extablishing a minimum tensioning force on the lower tension side of the rope.

8. A self-tensioning endless rope drive system as claimed in claim 7 in which said adjusting means takes the form of a take-up winch carried on said dolly.

9. A self-tensioning endless rope drive system as claimed in claim 2 in which a load may be transported bidirectionally and in which said load engaging element carried by said trailing dolly section is adapted to engage a load when said element is moved in one direction by said dolly but not when moved in the opposite direction and said dolly includes an additional dolly section carrying a sheave assembly, and a further sheave assembly carried by said leading dolly section matching said additional dolly section sheave assembly, the portion of the rope adjacent said rope separation and nearest said drive pulley assembly extending to said additional sheave assembly on said leading dolly section and thence in $n'$ passes between said further leading dolly section sheave assembly and said additional dolly section sheave assembly, $n'$ being a whole integer, and an additional load engaging element carried by said additional dolly section and adapted to engage a load only when said additional load engaging element is moved in said opposite direction by said dolly, whereby a load can be moved in either direction of movement of said rope with an approximate $1/n$ fraction of the force necessary to move the load in said one direction and an approximate $1/n'$ fraction of the force necessary to move the load in said opposite direction being transferred to the lower tension side of the rope as determined by the direction of movement of the rope and dolly.

10. A self-tensioning endless rope drive system as claimed in claim 9 in which resilient means is provided for urging said additional dolly section and said trailing dolly section away from each other.

* * * * *